United States Patent

[11] 3,610,377

| [72] | Inventor | Charles B. Leffert<br>Troy, Mich. |
|---|---|---|
| [21] | Appl. No. | 872,013 |
| [22] | Filed | Oct. 29, 1969 |
| [45] | Patented | Oct. 5, 1971 |
| [73] | Assignee | General Motors Corporation<br>Detroit, Mich.<br>Continuation-in-part of application Ser. No.<br>838,519, July 2, 1969, now abandoned. |

[54] DRUM BRAKE HEAT PIPE COOLING
5 Claims, 3 Drawing Figs.

[52] U.S. Cl. ................................................ 188/264CC, 192/113 B
[51] Int. Cl. ........................................................ F16d 65/82
[50] Field of Search .......................................... 188/264 D, 264 CC, 71.6; 192/113 B

[56] References Cited
UNITED STATES PATENTS
2,041,457  5/1936  Cautley ...................... 188/264 D
3,007,556  11/1961  Eames .......................... 188/264 D
3,063,532  11/1962  Jaeschke ...................... 188/264 D X
3,481,439  12/1969  Finkin .......................... 188/264 CC X

*Primary Examiner*—George E. A. Halvosa
*Attorneys*—W. E. Finken and D. D. McGraw ABSTRACT: A brake cooling system in which the brake drum is in heat transfer contact with the evaporator section of a heat pipe arrangement. The heat transferred during low levels of braking is transmitted to ambient air or other heat exchange means by conduction and convection. When sufficiently severe braking loads occur so that the conduction mode of heat transfer will not carry away the heat at a sufficient rate, the heat pipe liquid is vaporized and builds up vapor pressure to bring the heat pipe into efficient operation. As the cooling system quickly shifts into this mode of operation the entire heat pipe assembly in effect suddenly increases its thermal conductivity by several orders of magnitude and the heat is rapidly carried away to the heat pipe condenser section, where it is then removed by a suitable heat exchanger arrangement.

PATENTED OCT 5 1971 3,610,377

INVENTOR.
Charles B. Leffert
BY
D. D. McGraw
ATTORNEY

DRUM BRAKE HEAT PIPE COOLING

This is a Continuation-In-part of Ser. No. 838,519, filed July 2, 1969, now abandoned. The invention relates to cooling automobile drum brakes utilizing friction to absorb kinetic energy by converting the energy to heat, and more particularly to an arrangement wherein the increased thermal conductivity of a heat pipe at heavy heat loads maintains the rate of heat removal from the drum at a sufficiently high level to dissipate the heat generated without adversely affecting the brakes.

In order to brake a vehicle such as an automobile or truck moving horizontally, the kinetic energy of the entire mass of the vehicle must be converted to heat. There is some energy conversion by aerodynamic drag on the vehicle, engine compression, fluid temperature in the transmission and rolling friction of the wheels relative to the road surface, for example. However, the primary mechanism of conversion of this energy to heat is the vehicle brake system. Heat generation rates vary greatly in vehicle brake systems and adequate provision must be made for the dissipation of high heat loads in a short period of time. The problem of removal of heat has been attacked by providing heat sinks, air cooling, and liquid cooling. In the invention now disclosed and claimed, the heat transport device referred to in the art as a "thermocon" or a "heat pipe" is utilized. When drum brakes are used, the heat is removed from interfacial sliding surfaces. These surfaces may include the brake drum as well as the brake shoes. The brake drum is a fairly massive heat sink, is engaged throughout a relatively large arcuate portion of its internal cylindrical braking surface by the brake shoes, and has the outer surface cooled by convection currents of air. The brake pad shoes have little or no heat sink capability so that most of the heat generated by braking passes directly into the drum.

Under rapid deceleration approaching 1 g, the typical automobile weighing about 3600 pounds will transfer a power input into the drums which can heat the internal surface metal of the drum to high temperatures in the 1000° F. range. Much of the heat in the drum is temporarily stored in the surface layer of the metal, and is transferred toward the drum outer surface. The temperature gradient decreases toward the outer surface and heat flows to the air until the drum is cool. This often takes an extended period of time, and drums may be heated beyond the desired level under severe conditions of repeated heavy braking.

A device earlier known as the "thermocon," and now more commonly known as a "heat pipe," provides a more efficient transport of thermal energy than does ordinary conduction or convection. The device makes use of the high latent heat of vaporization of certain liquids and the high mass transport rates of the vapor phase to transport heat rapidly over appreciable distances with negligible temperature drops. The vapor is condensed, releasing the heat of vaporization, and returns by capillary action to the evaporator section of the heat pipe. A suitable wick material is provided to permit this operation. Heat pipes using various liquids such as ammonia, water, cesium, potassium, sodium, and lithium, have been built to operate at temperatures from the cryogenic regions to 2000° C.

For efficient operation, the vapor pressure in the heat pipe must be sufficient to carry the heat load, but must also be within the pressure limits of the tube wall. The vapor pressure of a liquid increases rapidly with temperature and with an excess of liquid available for vaporization in the tube, extreme pressures can be generated if the temperature of the entire pipe becomes too high. Because of these limitations, the temperature range for efficient operation of any particular heat pipe is limited to a small range about the boiling point of the liquid at atmospheric pressure. Since it is generally desirable to keep brake lining temperatures at a level well below that at which brake fade may occur, it is desirable to use a heat pipe fluid with a boiling point near the desired brake lining temperature operating limit. This may be about 350° F., for example.

The prior art indicating the early development of the thermocon or heat pipe includes the following U.S. Pat. Nos. issued on the dates noted to Richard S. Gaugler: 2,350,347, issued June 6, 1944; 2,350,348, issued June 6, 1944; 2,422,401, issued June 17, 1947; 2,448,261, issued Aug. 31, 1948; 2,466,541, issued Apr. 5, 1949; 2,514,572, issued July 11, 1950; 2,517,654, issued Aug. 8, 1950; 2,565,220, issued Aug. 21, 1951; 2,565,221, issued Aug. 21, 1951; 2,583,769, issued Jan. 29, 1952 and 2,702,460, issued Feb. 22, 1955.

Numerous articles have also been published on various facets of the heat pipe and for the purpose of illustrating the state of the art reference is hereby made to the article entitled "The Heat Pipe" by G. Yale Eastman, published in the May, 1968 issue of "Scientific American" beginning on page 38; and the article entitled "The Heat Pipe" published by Messrs. K. Thomas Feldman, Jr. and Glen H. Whiting in the Feb. 1967 issue of "Mechanical Engineering" beginning on page 30.

The invention involves a drum brake cooling system in which the rotatable brake drum to be braked by a friction apply assembly has a brake cooling arrangement including suitable heat dispersing means, a heat conducting member receiving heat from the drum while and after it is being braked, a heat pipe assembly in which the heat so received heats liquid in the heat pipe and evaporates it, the vapor carrying the heat to a condenser section of the heat pipe where most of the heat is delivered to the heat dispersing means, and the condensed liquid is then returned through the heat pipe to again be heated to a state of vaporization, until the heat transferred from the rotating member is at sufficiently low rate to no longer vaporize the heat pipe liquid.

Figure 1:
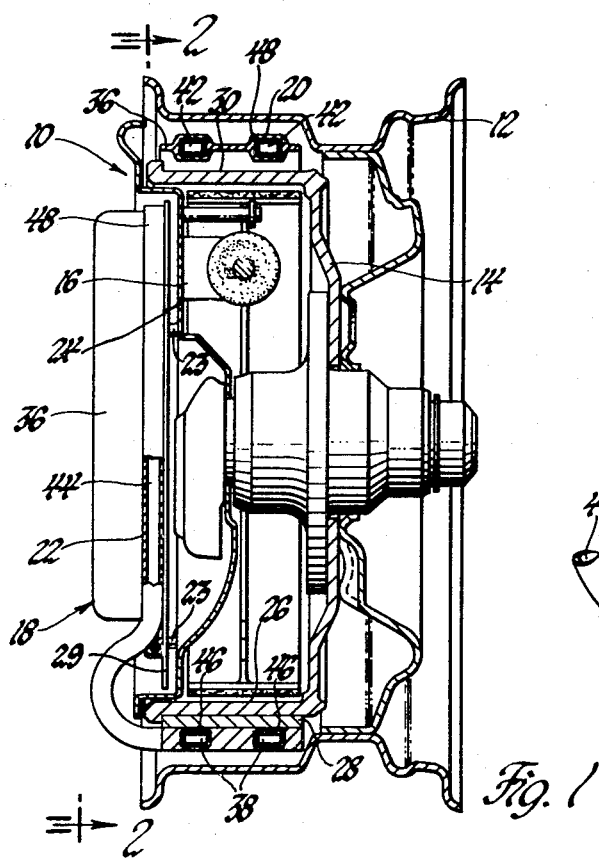
FIG. 1 is a cross section view with parts broken away, illustrating a drum brake assembly embodying the invention.

The brake assembly 10 is illustrated as being for a vehicle wheel 12, and includes a brake drum 14 rotatable with the vehicle wheel, a brake actuator assembly 16 of any suitable type which will provide for friction braking of the drum 14, and a heat pipe arrangement 18. The heat pipe arrangement is suitably mounted about the outer periphery and on one side of the drum 14. The heat pipe arrangement includes an outer circumferential heat pipe assembly 20 and an inner side-positioned heat pipe assembly 22. These assemblies are functionally similar in construction, with the side-positioned assembly 22 supporting the circumferential assembly, and the side assembly mounted to suitable support bracket such as backing plate 24 which also mounts the brake actuator assembly 16.

Figure 3:
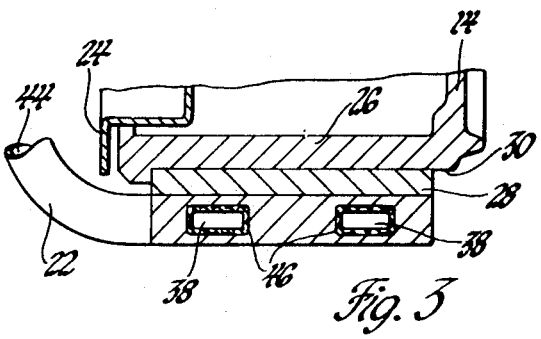
FIG. 3 is a fragmentary enlarged cross section view with parts broken away and showing a portion of the mechanism of FIG. 1.

Since heat is to be transferred from the friction braking surface 26 to the heat pipe arrangement through the drum and from the drum by conduction, the heat pipe arrangement is provided with a heat pipe cooling pad 28. This pad is held into heat conduction engagement with the outer surface 30 of the drum on the drum lower side, shown in FIG. 3 in detail.

Figure 2:
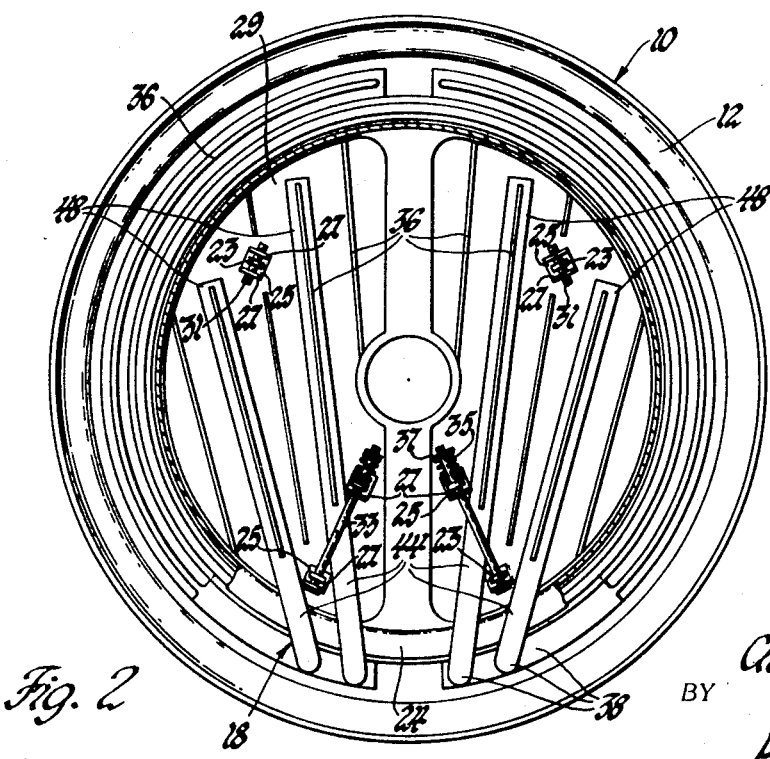
FIG. 2 is an elevation view of the mechanism of FIG. 1 taken in the direction of arrows 2—2 of that figure.

The particular mounting arrangement illustrated in FIG. 2 provides for slight radial movement of the heat pipe arrangement 18. Lugs 23 extend from the backing plate 22 and through apertures 25, which are formed by the striking out of tabs 27 from the mounting plate 29 of the heat pipe assembly 22.

The short rods 31 and the longer rods 33 extend through aligned openings in their cooperating tabs and lugs and limit the direction and amount of movement of the arrangement 18.

Springs 35 are installed on the longer rods 33 and act against their spring seats 37 and their associated lugs 23 to hold the cooling pad 28 in heat conduction engagement with the outer surface 30 of the drum. It can thus be seen that the arrangement 18 is held against rotation and is oriented so that the evaporator portions of the heat pipe assemblies are at the lower parts thereof and the condenser portions are above them. This assists in obtaining circulatory movement of the heat pipe fluid by permitting the fluid to rise during its vapor phase and to flow downwardly under gravitational influence in its liquid stage.

The heat pipe assemblies are also provided with cooling fins 36. These fins extend outward axially, and also chordally on the side-positioned assembly inward and outward, to provide suitable heat dispersing means so that the heat removed from the drum is exchanged and dissipated to the atmosphere. In some constructions other heat exchanger arrangements may be utilized, such as liquid cooling heat exchangers.

The heat pipe assemblies have evaporator sections 38 adjacent the heat pipe cooling pad 28. The heat pipes include chambers or tubes formed in the portions of each pipe assembly. Thus, the heat pipe assembly 20 is illustrated as being provided with two tubelike chambers 42, and the inner side-positioned heat pipe assembly 22 is illustrated as being provided with four tubelike chambers 44. Each chamber is closed and has a tubular formed wick 46 extending through the tubes or chambers so that each pipe portion of each heat pipe assembly has a tubelike chamber containing a tubelike wick engaging the chamber wall and defining a hollow center section. When heat is transferred to the heat pipe evaporator sections 38 from drum 14 through cooling pad 28, some of the heat is delivered to the heat dispersing cooling fins 36 by conduction. However, much of the heat is delivered to the heat pipe liquid contained in the pipe assemblies, and when the heat transferred is sufficient, the heat pipe liquid is vaporized and passes through the hollow center sections of each heat pipe to the heat pipe condenser sections 48, which are at the other ends of the heat pipes. In the condenser sections the vaporized liquid is cooled sufficiently to condense it, the heat of vaporization and other heat removed being transferred to the heat dispersing cooling fins 36, and the condensed liquid returned to the evaporator sections 38 through the wicks 46 by capillary action. Thus, the system makes use of ordinary conduction heat transfer for light braking loads and brings the heat pipes into operation under more severe braking loads when high heat extraction loads are required.

The peripherally and arcuately extending heat pipes of assembly 20 are in spaced relation to the drum 14 so that cooling air may circulate around their evaporator sections.

The side-positioned heat pipe assembly is in axially spaced relation to the drum internal braking surface 26 but within the extended cylinder of that surface, and is on the opposite side of the backing plate from the brake shoes so that it can take full advantage of the air stream passing by.

What is claimed is:

1. In a brake assembly having a rotatable member to be braked and braking means for frictionally engaging said rotatable member on one side thereof,
   a nonrotatable brake cooling assembly having a heat pipe arrangement with an evaporator section and a condenser section and a cooling pad engaging said rotatable member on the other side thereof for conducting heat from said rotatable member to said condenser section, and heat dispersing means receiving heat from said pipe arrangement and dispersing heat so received remotely of said rotatable member.

2. In the brake assembly of claim 1,
   said rotatable member being a brake drum having an internal cylindrical friction braking surface engaged by said braking means, and an external cylindrical surface substantially concentric with said internal braking surface and engaged by said cooling pad.

3. In the brake assembly of claim 2,
   said heat pipe arrangement having pipes extending peripherally and arcuately about said drum in spaced relation thereto and being parts of said evaporator section and said condenser section.

4. In the brake assembly of claim 2,
   said heat pipe arrangement condenser section being positioned in axially spaced relation from said internal friction braking surface and substantially within the extended cylinder of said internal friction braking surface.

5. In the brake assembly of claim 2,
   further including a backing plate mounting for said friction braking means, and said heat pipe arrangement condenser section being positioned on the other side of said backing plate from said friction braking means.